United States Patent
Caputo et al.

(10) Patent No.: US 9,795,199 B2
(45) Date of Patent: Oct. 24, 2017

(54) MOTORIZED LUGGAGE ASSEMBLY

(71) Applicants: Amber Caputo, Staten Island, NY (US); George Nieves, Staten Island, NY (US)

(72) Inventors: Amber Caputo, Staten Island, NY (US); George Nieves, Staten Island, NY (US)

( * ) Notice: Subject to any disclaimer, the term of this patent is extended or adjusted under 35 U.S.C. 154(b) by 103 days.

(21) Appl. No.: 14/866,859

(22) Filed: Sep. 26, 2015

(65) Prior Publication Data

US 2017/0086549 A1    Mar. 30, 2017

(51) Int. Cl.
| | |
|---|---|
| A45C 5/14 | (2006.01) |
| G05D 1/00 | (2006.01) |
| G01S 19/13 | (2010.01) |
| G01S 5/02 | (2010.01) |
| A45C 13/26 | (2006.01) |
| A45C 7/00 | (2006.01) |
| A45C 13/18 | (2006.01) |
| A45C 3/00 | (2006.01) |

(52) U.S. Cl.
CPC .............. *A45C 5/14* (2013.01); *A45C 7/0022* (2013.01); *A45C 7/0036* (2013.01); *A45C 13/18* (2013.01); *A45C 13/262* (2013.01); *G01S 5/0294* (2013.01); *G01S 19/13* (2013.01); *G05D 1/0011* (2013.01); *A45C 2003/002* (2013.01)

(58) Field of Classification Search
None
See application file for complete search history.

(56) References Cited

U.S. PATENT DOCUMENTS

| | | | |
|---|---|---|---|
| 4,043,126 A | 8/1977 | Santos | |
| 4,123,910 A | 11/1978 | Ellison, Sr. | |
| 5,847,470 A | 12/1998 | Mitchell | |
| 7,252,302 B1 * | 8/2007 | Thurn | B62B 3/027 280/47.34 |
| 7,271,555 B1 | 9/2007 | Ciccone | |
| 8,240,416 B2 | 8/2012 | Cong | |
| 2007/0131462 A1 * | 6/2007 | Hemsley | A45C 5/14 180/19.3 |
| 2007/0137958 A1 * | 6/2007 | Hamlin | A45C 7/0022 190/109 |
| 2008/0169133 A1 | 7/2008 | Tomoyasu | |
| 2014/0002239 A1 * | 1/2014 | Rayner | G08B 13/1427 340/5.61 |
| 2014/0107868 A1 * | 4/2014 | DiGiacomcantonio | A45C 5/14 701/2 |
| 2014/0277841 A1 * | 9/2014 | Klicpera | A45C 5/14 701/2 |
| 2014/0323079 A1 * | 10/2014 | Paolini | G08B 25/016 455/404.2 |
| 2016/0255928 A1 * | 9/2016 | O'Donnell | A45C 5/03 |

* cited by examiner

Primary Examiner — J. Allen Shriver, II
Assistant Examiner — Hilary L Johns

(57) ABSTRACT

A motorized luggage assembly includes a base unit that may contain objects and the base unit may be placed on a support surface. The base unit is structured to roll along the support surface. The base unit includes a mobility unit that is coupled to the base unit. The mobility unit is urges the base unit along the support surface. A tracking unit is coupled to the base unit. The tracking unit is operationally coupled to the mobility unit such that the tracking unit steers the mobility unit. A remote unit is provided and the remote unit may be worn. The remote unit is in communication with the base unit such that the base unit may follow the remote unit.

11 Claims, 4 Drawing Sheets

MOTORIZED LUGGAGE ASSEMBLY

BACKGROUND OF THE DISCLOSURE

Field of the Disclosure

The disclosure relates to luggage devices and more particularly pertains to a new luggage device to facilitating an article of luggage to track and follow a user.

SUMMARY OF THE DISCLOSURE

An embodiment of the disclosure meets the needs presented above by generally comprising a base unit that may contain objects and the base unit may be placed on a support surface. The base unit is structured to roll along the support surface. The base unit includes a mobility unit that is coupled to the base unit. The mobility unit is urges the base unit along the support surface. A tracking unit is coupled to the base unit. The tracking unit is operationally coupled to the mobility unit such that the tracking unit steers the mobility unit. A remote unit is provided and the remote unit may be worn. The remote unit is in communication with the base unit such that the base unit may follow the remote unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
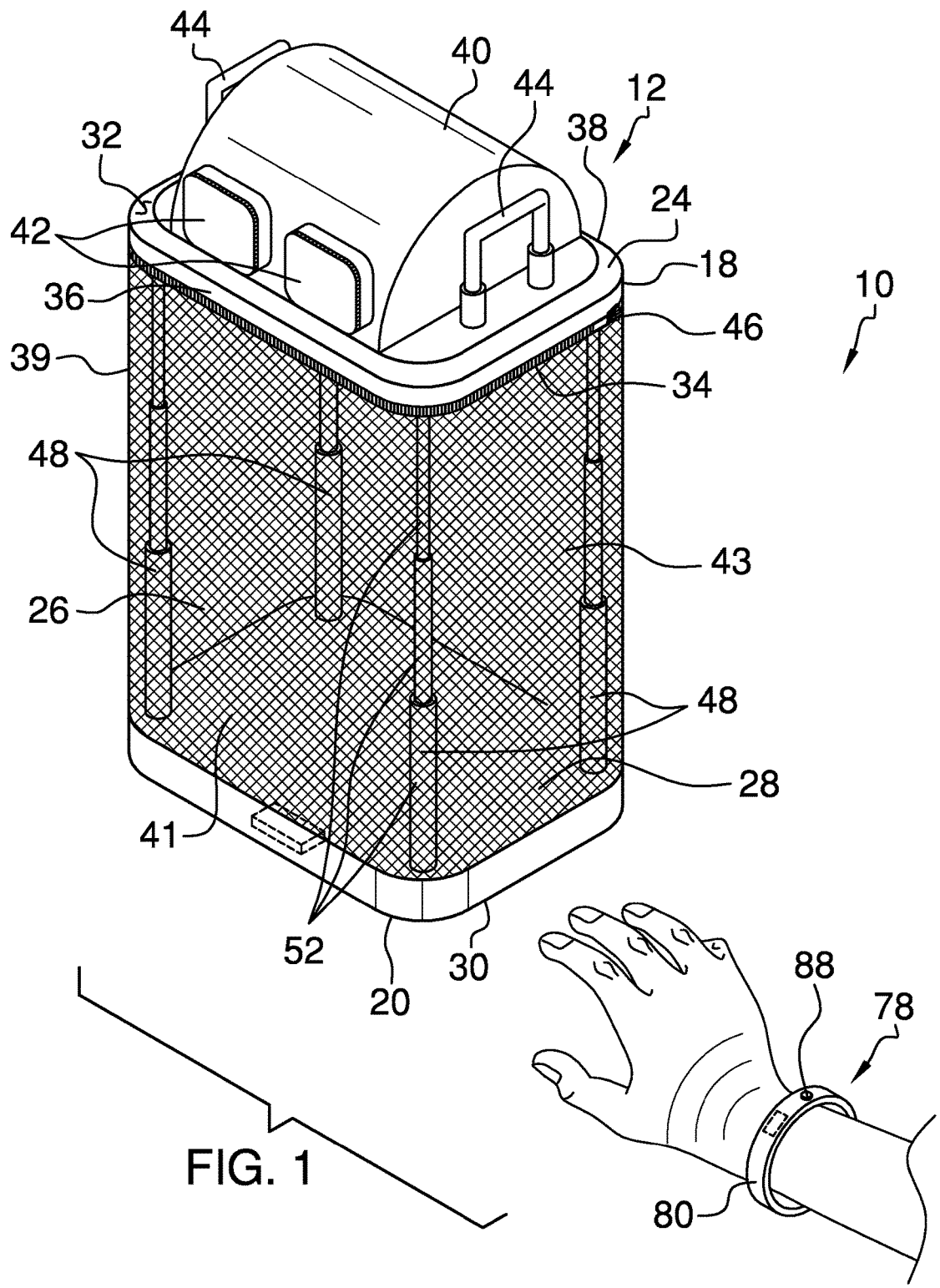
FIG. 1 is a front perspective view of a motorized luggage assembly according to an embodiment of the disclosure.
Figure 2:
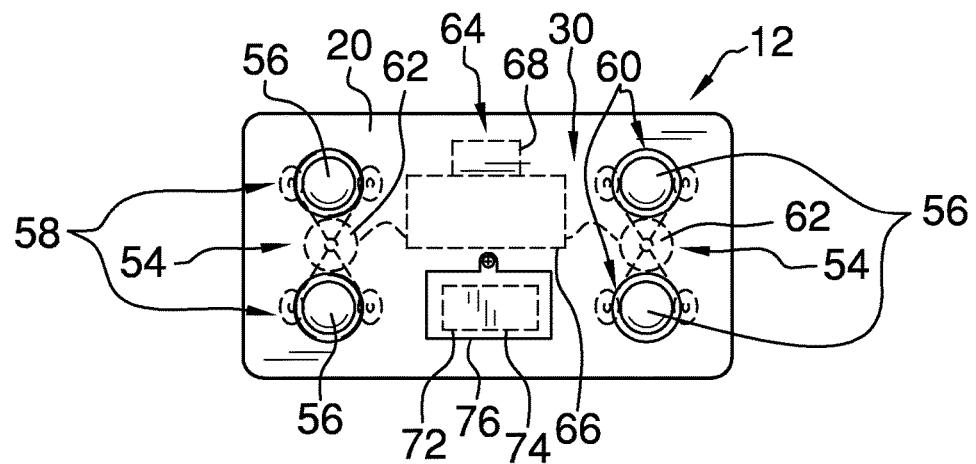
FIG. 2 is a bottom view of an embodiment of the disclosure.
Figure 3:
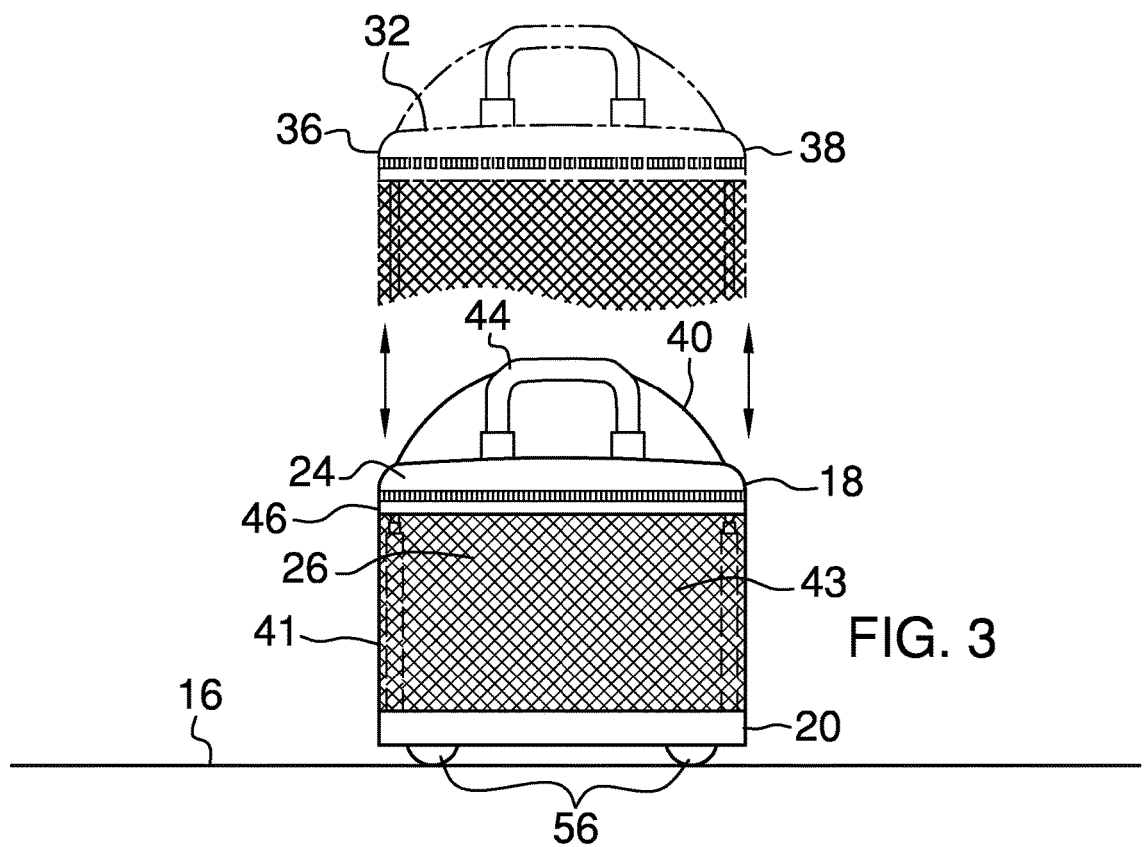
FIG. 3 is a right side view of an embodiment of the disclosure.

With reference now to the drawings, and in particular to FIGS. 1 through 5 thereof, a new luggage device embodying the principles and concepts of an embodiment of the disclosure and generally designated by the reference numeral 10 will be described.

As best illustrated in FIGS. 1 through 5, the motorized luggage assembly 10 generally comprises a base unit 12 that may contain objects and the base unit 12 may be placed on a support surface 16. The support surface 16 may comprise a floor or the like and the base unit 12 is structured to roll along the support surface 16. The base unit 12 comprises a container 18 that has a bottom wall 20, a top wall 24 and a peripheral wall 26 extends between the bottom wall 20 and the top wall 24. The bottom wall 20 has an upper surface 28 and a lower surface 30. The top wall 24 has a top surface 32, a bottom surface 34, a front edge 36 and a back edge 38. The peripheral wall 26 has a first lateral side 39, a front side 41 and a second lateral side 43.

The peripheral wall 26 is comprised of a deformable material. Thus, the container 18 is positionable between a collapsed position and an extended position. The top wall 24 and the bottom wall 20 are positioned adjacent to each other when the container 18 is positioned in the collapsed position. The top wall 24 is spaced from the bottom wall 20 when the container 18 is positioned in the extended position. Additionally, the peripheral wall 26 may be comprised of a mesh material.

The top wall 24 has a raised portion 40 and the raised portion 40 is centrally positioned on the top surface 32. The raised portion 40 extends substantially between the front edge 36 and the back edge 38 and the raised portion 40 is substantially hollow. The raised portion 40 is curved between the front edge 36 and the back edge 38 such that the raised portion 40 has a semi-cylindrical shape. A pair of pockets 42 is provided and each of the pockets 42 is coupled to the raised portion 40. Each of the pockets 42 provides access to an interior of the raised portion 40 and each of the pockets 42 is positioned adjacent to the front edge 36. The pockets 42 are spaced apart from each other and distributed along the raised portion 40. The raised portion 40 may be comprised of a thermally insulating material such that the raised portion 40 may maintain cold objects at a cool temperature with respect to ambient temperature.

Figure 4:
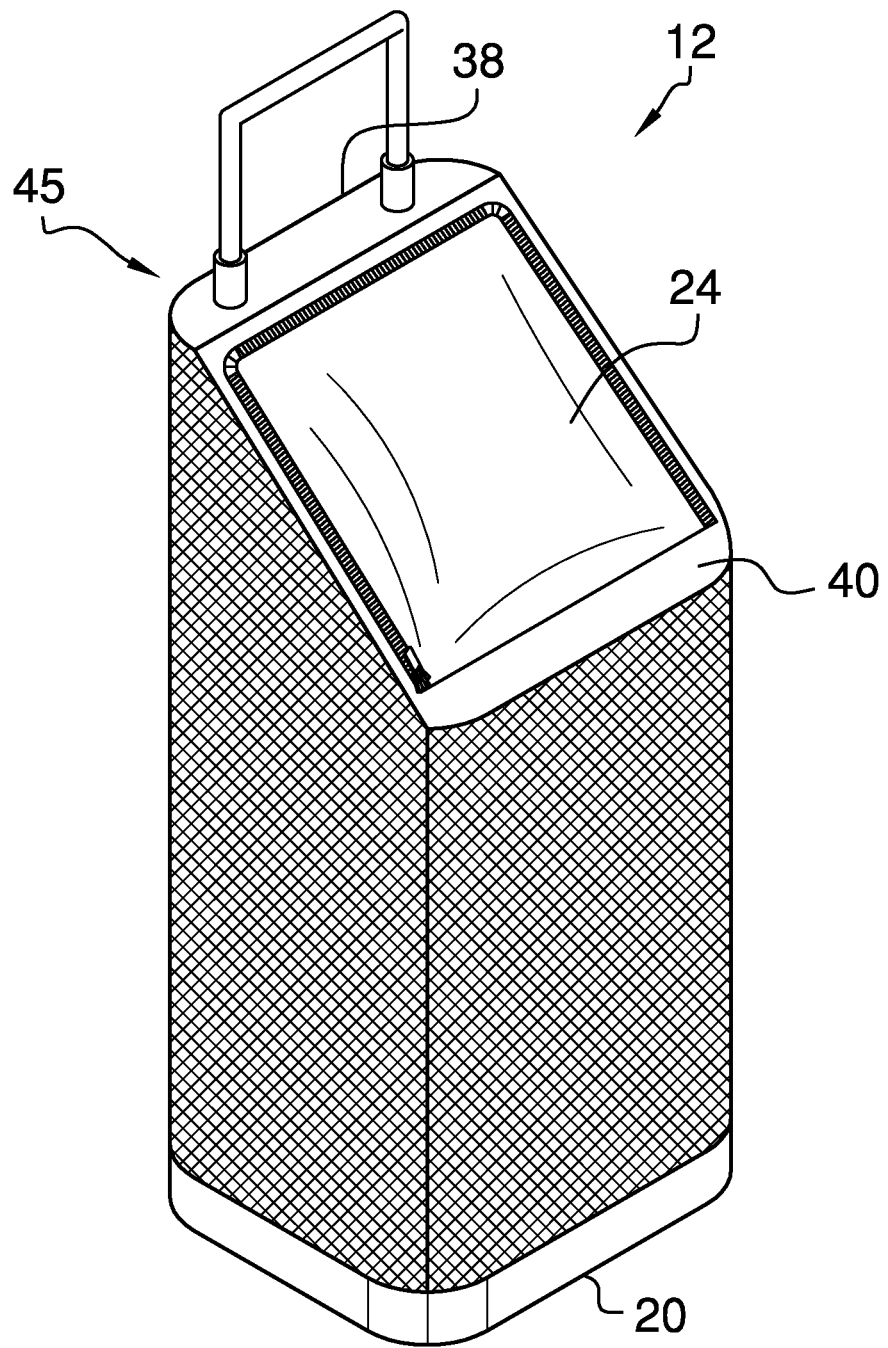
FIG. 4 is a top perspective view of an alternative embodiment of the disclosure.
Figure 5:
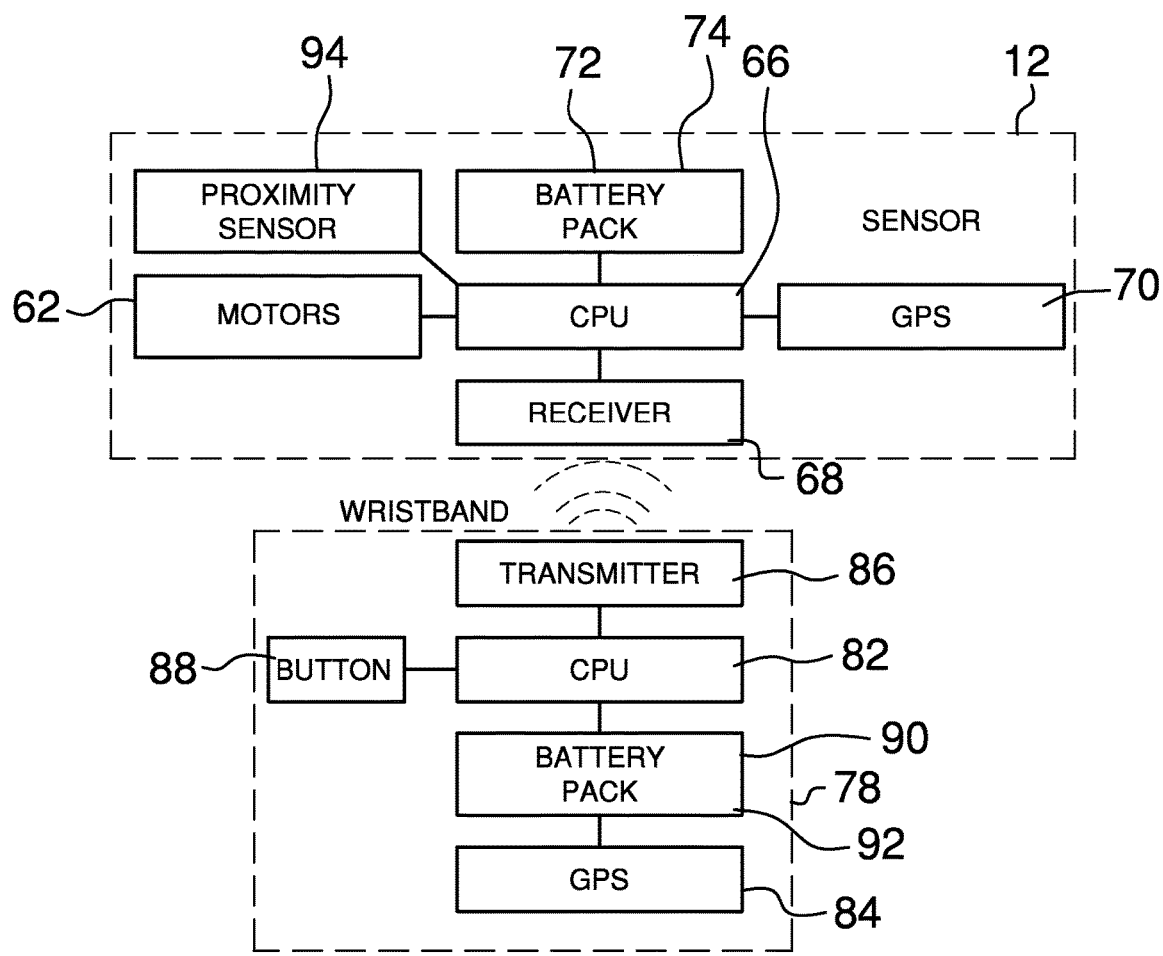
FIG. 5 is a schematic view of an embodiment of the disclosure.

A pair of handles 44 is provided. Each of the handles 44 is coupled to the top wall 44. Thus, each of the handles 44 may be gripped. Each of the handles 44 is positioned adjacent to opposite sides of the raised portion 40. In an alternative embodiment 45 as shown in FIG. 4, the top wall 24 may slope downwardly between the back edge 38 and the front edge 36. The raised portion 40 is not present on the top wall 24 in the alternative embodiment 45.

A closure 46 is coupled between the top wall 24 and the peripheral wall 26 such that the closure 46 may be manipulated. The closure 46 extends along the first lateral side 39, the front side 41 and the second lateral side 43 of the peripheral wall 26. The closure 46 may be positioned in a closed position having the peripheral wall 26 being secured to the top wall 24. The closure 46 may be positioned in an open position having the peripheral wall 26 being unsecured with respect to the top wall 24 to access an interior of the container 18. The closure 46 may comprise a zipper or the like and the objects may be placed in the container 18 when the closure 46 is positioned in the open position.

A plurality of rods 48 is provided and each of the rods 48 extends between the upper surface 28 of the bottom wall 20 and the bottom surface 34 of the top wall 24. Each of the rods 48 is positioned adjacent to an associated one of four corners 50 of the container 18. Each of the rods 48 has a plurality of slidable sections 52 such that each of the rods 48 has a telescopically adjustable length. Each of the rods 48 retains the container 18 in the extended position and the collapsed position.

A mobility unit 54 is coupled to the base unit 12 and the mobility unit 54 urges the base unit 12 along the support surface 16. The mobility unit 54 comprises a plurality of wheels 56 and each of the wheels 56 is rotatably coupled to the lower surface 30 of the bottom wall 20. Each of the wheels 56 is positioned adjacent to an associated one of the four corners 50 of the container 18. Each of the wheels 56 may abut the support surface 16 thereby facilitating the container 18 to roll along the support surface 16. The plurality of wheels 56 comprises a first set of wheels 58 and a second set of wheels 60. The first set of wheels 58 is spaced from the second set of wheels 60.

A pair of motors 62 is provided and each of the motors 62 is coupled to the bottom wall 20. Each of the motors 62 is mechanically coupled to an associated one of the first set of wheels 58 and the second set of wheels 60. Each of the motors 62 rotates the associated first set of wheels 58 and second set of wheels 60. Thus, each of the motors 62 urges the container 18 along the support surface 16. Each of the motors 62 urge the associated first set of wheels 58 and the second set of wheels 60 to rotate about an axis extending through the upper surface 28 and the lower surface 30 of the bottom wall 20. Thus, each of the motors 62 may steer the container 18 in a selected direction along the support surface 16. Each of the motors 62 may be mechanically coupled to the wheels 56 through any conventional mechanical mean.

A tracking unit 64 is coupled to the base unit 12. The tracking unit 64 is operationally coupled to the mobility unit 54 such that the tracking unit 64 steers the mobility unit 54. The tracking unit 64 comprises a base processor 66 that is coupled to the bottom wall 20 of the container 18. The base processor 66 is electrically coupled to each of the motors 62. A receiver 68 is coupled to the bottom wall 20 and the receiver 68 is electrically coupled to the base processor 66. The receiver 68 may comprise a radio frequency receiver or the like.

A base global positioning system 70 is electrically coupled to the base processor 66. The base global positioning system 70 is in electrical communication with a satellite. Thus, the base global positioning system 70 determines a location of the base unit 12 with respect to Earth. A base power supply 72 is coupled to the bottom wall 20 and the base power supply 72 is electrically coupled to the base processor 66. The base power supply 72 comprises at least one battery 74. A battery cover 76 is removably coupled to the lower surface 30 of the bottom wall 20 and the battery 74 is positioned beneath the battery cover 76.

A remote unit 78 is provided and the remote unit 78 may be worn. The remote unit 78 is in communication with the base unit 12 such that the base unit 12 may follow the remote unit 78. The remote unit 78 comprises a bracelet 80 that may be worn. A remote processor 82 is positioned within the bracelet 80. A remote global positioning system 84 is positioned within the bracelet 80. The remote global positioning system 84 is electrically coupled to the remote processor 82. The remote global positioning system 84 is in electrical communication with the satellite. Thus, the remote global positioning system 84 determines a location of the remote unit 78 with respect to Earth.

A transmitter 86 is positioned within the bracelet 80 and the transmitter 86 is electrically coupled to the remote processor 82. The transmitter 86 is in electrical communication with the receiver 68 thereby facilitating the transmitter 86 to communicate the position of the remote unit 78 to the receiver 68. The transmitter 86 may comprise a radio frequency transmitter or the like. The base processor actuates 66 each of the motors 62 to urge the base unit 12 to remain within a pre-determined distance from the remote unit 78. Thus, the base unit 12 follows the remote unit 78. The pre-determined distance may be a distance ranging between approximately 5 feet and 10 feet.

A button 88 is coupled to the bracelet 80 such that the button 88 may be manipulated. The button 88 is electrically coupled to the remote processor 82. The button 88 turns both the remote unit 78 and the base unit 12 on and off when the button 88 is manipulated. A remote power supply 90 is positioned within the bracelet 80. The remote power supply 90 is electrically coupled to the remote processor 82 and the remote power supply 90 comprises at least one battery 92.

The tracking unit 64 additionally includes a proximity sensor 94. The proximity sensor 94 is coupled to the bottom wall 20 and the proximity sensor 94 is positioned adjacent to the front side 41 of the peripheral wall 26. The proximity sensor 94 is electrically coupled to the base processor 66. The proximity sensor 94 detects an obstruction with respect to the base unit 12 when the base unit 12 is travelling along the support surface 16. Thus, the motors 62 urge each of the first set of wheels 58 and the second set of wheels 60 to urge the base unit 12 around the obstruction thereby facilitating the base unit 12 to continue following the remote unit 78.

In use, the base unit 12 and the remote unit 78 are utilized to transport the container 18 through a crowded area such as an airport or the like. The button 88 is manipulated to turn the remote unit 78 on and to turn the base unit 12 on. The base global positioning system 70 and the remote global positioning system 84 establish the respective locations of the base unit 12 and the remote unit 78 with respect to Earth. The transmitter 86 communicates the location of the remote unit 78 to the receiver 68. The motors 62 on the base unit 12 urge the wheels 56 to rotate thereby facilitating the base unit 12 to follow the remote unit 78 as the remote unit 78 is moved. Thus, the base unit 12 stays within the pre-determined distance with respect to the remote unit 78. Additionally, the base global positioning system 70 facilitates the base unit 12 to be located if the base unit 12 becomes lost or stolen.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A motorized luggage assembly configured to follow a user, said assembly comprising:
 a base unit being configured to contain objects, said base unit being configured to be placed on a support surface, said base unit being structured to roll along the support surface, said base unit including:
  a container having a bottom wall, a top wall and a peripheral wall extending between said bottom wall and said top wall, said bottom wall having an upper surface and a lower surface, said top wall having a top surface, a bottom surface, a front edge and a back edge, said peripheral wall having a first lateral side, a front side and a second lateral side, said peripheral wall is comprised of a deformable material such that said container is positionable between a collapsed position and an extended position, said top wall and said bottom wall being positioned adjacent to each other when said container is positioned in said collapsed position, said top wall being spaced from said bottom wall when said container is positioned in said extended position, said top wall has a raised portion, said raised portion being centrally positioned on said top surface, said raised portion extending substantially between said front edge and said back edge, said raised portion being curved between said front edge and said back edge such that said raised portion has a semi-cylindrical shape, a mobility unit being coupled to said base unit, said mobility unit being configured to urge said base unit along the support surface, said mobility unit comprising a plurality of wheels, each of said wheels being rotatably coupled to said lower surface of said bottom wall, each of said wheels being positioned adjacent to an associated one of said four corners of said container, each of said wheels being configured to abut the support surface thereby facilitating said container to roll along the support surface, said plurality of wheels comprising a first set of wheels and a second set of wheels, said first set of wheels being spaced from said second set of wheels, said mobility unit further comprising a pair of motors, each of said motors being coupled to said bottom wall, each of said motors being mechanically coupled to an associated one of said first set of wheels and said second set of wheels, each of said motors rotating said associated first set of wheels and second set of wheels wherein each of said motors is configured to urge said container along the support surface, and a tracking unit being coupled to said base unit, said tracking unit being operationally coupled to said mobility unit such that said tracking unit steers said mobility unit;

a remote unit being configured to be worn, said remote unit being in communication with said base unit wherein said base unit is configured to follow said remote unit, said remote unit comprising a bracelet configured to be worn and a remote processor being positioned within said bracelet; and a remote global positioning system being positioned within said bracelet, said remote global positioning system being electrically coupled to said remote processor, said remote global positioning system being configured to be in electrical communication with a satellite thereby facilitating said remote global positioning system to determine a location of said remote unit with respect to Earth.

2. The assembly according to claim 1, further comprising a pair of pockets, each of said pockets being coupled to said raised portion, each of said pockets being positioned adjacent to said front edge, said pockets being spaced apart from each other and distributed along said raised portion.

3. The assembly according to claim 1, further comprising a pair of handles, each of said handles being coupled to said top wall wherein each of said handles is configured to be gripped, each of said handles being positioned adjacent to opposite sides of said raised portion.

4. The assembly according to claim 1, further comprising a closure being coupled between said top wall and said peripheral wall wherein said closure is configured to be manipulated, said closure extending along said first lateral side, said front side and said second lateral side, said closure being positioned in a closed position having said peripheral wall being secured to said top wall, said closure being positioned in an open position having said peripheral wall being unsecured with respect to said top wall to access an interior of said container.

5. The assembly according to claim 1, wherein each of said motors urges said associated first set of wheels and said second set of wheels to rotate about an axis extending through said upper surface and said lower surface of said bottom wall wherein each of said motors is configured to steer said container in a selected direction along the support surface.

6. The assembly according to claim 1, further comprising:
   said base unit comprising a container, said container having a bottom wall;
   a pair of motors; and
   said tracking unit comprising:
      a base processor being coupled to said bottom wall of said container, said base processor being electrically coupled to each of said motors; and
      a receiver being coupled to said bottom wall, said receiver being electrically coupled to said base processor.

7. The assembly according to claim 6, wherein said tracking unit further comprises:
   a base global positioning system, said base global positioning system being electrically coupled to said base processor, said base global positioning system being configured to be in electrical communication with a satellite thereby facilitating said base global positioning system to determine a location of said base unit with respect to Earth, and
   a base power supply being coupled to said bottom wall, said base power supply being electrically coupled to said base processor, said base power supply comprising at least one battery.

8. The assembly according to claim 1, further comprising:
   a receiver being coupled to said base unit;
   a pair of motors, each of said motors being coupled to said base unit; and
   a transmitter being positioned within said bracelet, said transmitter being electrically coupled to said remote processor, said transmitter being in electrical communication with said receiver thereby facilitating said transmitter to communicate the position of said remote unit to said receiver, said base processor actuating each of said motors to urge said base unit to remain within a pre-determined distance from said remote unit such that said base unit follows said remote unit.

9. The assembly according to claim 1, further comprising a button being coupled to said bracelet wherein said button is configured to be manipulated, said button being electrically coupled to said remote processor, said button turning said remote unit on and said base unit on when said button is manipulated.

10. The assembly according to claim 1, further comprising a remote power supply being positioned within said bracelet, said remote power supply being electrically coupled to said remote processor, said remote power supply comprising at least one battery.

11. A motorized luggage assembly configured to follow a user, said assembly comprising:
- a base unit being configured to contain objects, said base unit being configured to be placed on a support surface, said base unit being structured to roll along the support surface, said base unit comprising:
  - a container having a bottom wall, a top wall and a peripheral wall extending between said bottom wall and said top wall, said bottom wall having an upper surface and a lower surface, said top wall having a top surface, a bottom surface, a front edge and a back edge, said peripheral wall having a first lateral side, a front side and a second lateral side, said peripheral wall being comprised of a deformable material such that said container is positionable between a collapsed position and an extended position, said top wall and said bottom wall being positioned adjacent to each other when said container is positioned in said collapsed position, said top wall being spaced from said bottom wall when said container is positioned in said extended position, said top wall having a raised portion, said raised portion being centrally positioned on said top surface, said raised portion extending substantially between said front edge and said back edge, said raised portion being curved between said front edge and said back edge such that said raised portion has a semi-cylindrical shape,
  - a pair of pockets, each of said pockets being coupled to said raised portion, each of said pockets being positioned adjacent to said front edge, said pockets being spaced apart from each other and distributed along said raised portion,
  - a pair of handles, each of said handles being coupled to said top wall wherein each of said handles is configured to be gripped, each of said handles being positioned adjacent to opposite sides of said raised portion,
  - a closure being coupled between said top wall and said peripheral wall wherein said closure is configured to be manipulated, said closure extending along said first lateral side, said front side and said second lateral side, said closure being positioned in a closed position having said peripheral wall being secured to said top wall, said closure being positioned in an open position having said peripheral wall being unsecured with respect to said top wall to access an interior of said container, and
  - a plurality of rods, each of said rods extending between said upper surface of said bottom wall and said bottom surface of said top wall, each of said rods being positioned adjacent to an associated one of four corners of said container, each of said rods having a plurality of slidable sections such that each of said rods has a telescopically adjustable length, each of said rods retaining said container in said extended position and said collapsed position;
  - a mobility unit being coupled to said base unit, said mobility unit being configured to urge said base unit along the support surface, said mobility unit comprising:
    - a plurality of wheels, each of said wheels being rotatably coupled to said lower surface of said bottom wall, each of said wheels being positioned adjacent to an associated one of said four corners of said container, each of said wheels being configured to abut the support surface thereby facilitating said container to roll along the support surface, said plurality of wheels comprising a first set of wheels and a second set of wheels, said first set of wheels being spaced from said second set of wheels, and
    - a pair of motors, each of said motors being coupled to said bottom wall, each of said motors being mechanically coupled to an associated one of said first set of wheels and said second set of wheels, each of said motors rotating said associated first set of wheels and second set of wheels wherein each of said motors is configured to urge said container along the support surface, each of said motors urging said associated first set of wheels and said second set of wheels to rotate about an axis extending through said upper surface and said lower surface of said bottom wall wherein each of said motors is configured to steer said container in a selected direction along the support surface;
  - a tracking unit being coupled to said base unit, said tracking unit being operationally coupled to said mobility unit such that said tracking unit steers said mobility unit, said tracking unit comprising:
    - a base processor being coupled to said bottom wall of said container, said base processor being electrically coupled to each of said motors,
    - a receiver being coupled to said bottom wall, said receiver being electrically coupled to said base processor,
    - a base global positioning system, said base global positioning system being electrically coupled to said base processor, said base global positioning system being configured to be in electrical communication with a satellite thereby facilitating said base global positioning system to determine a location of said base unit with respect to Earth, and
    - a base power supply being coupled to said bottom wall, said base power supply being electrically coupled to said base processor, said base power supply comprising at least one battery; and
- a remote unit being configured to be worn, said remote unit being in communication with said base unit wherein said base unit is configured to follow said remote unit, said remote unit comprising:
  - a bracelet configured to be worn,
  - a remote processor being positioned within said bracelet,
  - a remote global positioning system being positioned within said bracelet, said remote global positioning system being electrically coupled to said remote processor, said remote global positioning system being configured to be in electrical communication with the satellite thereby facilitating said remote global positioning system to determine a location of said remote unit with respect to Earth,
  - a transmitter being positioned within said bracelet, said transmitter being electrically coupled to said remote processor, said transmitter being in electrical communication with said receiver thereby facilitating said transmitter to communicate the position of said remote unit to said receiver, said base processor actuating said each of said motors to urge said base unit to remain within a pre-determined distance from said remote unit such that said base unit follows said remote unit,
  - a button being coupled to said bracelet wherein said button is configured to be manipulated, said button being electrically coupled to said remote processor, said button turning said remote unit on and said base unit on when said button is manipulated, and a remote power supply being positioned within said bracelet, said remote power supply being electrically coupled to said remote processor, said remote power supply comprising at least one battery.

\* \* \* \* \*